J. MEYER AND F. J. MANSEAU.
COMBINED WAGON AND AUTOMOBILE TRUCK DUMPING AND WEIGHING PLATFORM.
APPLICATION FILED SEPT. 2, 1920.
1,403,805.
Patented Jan. 17, 1922.
4 SHEETS—SHEET 4.
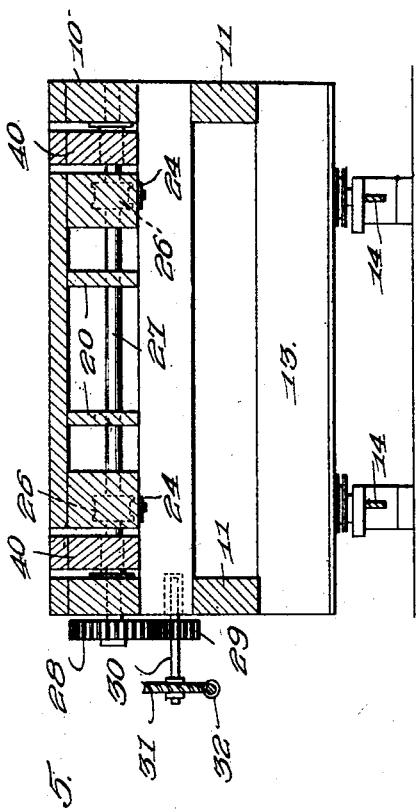
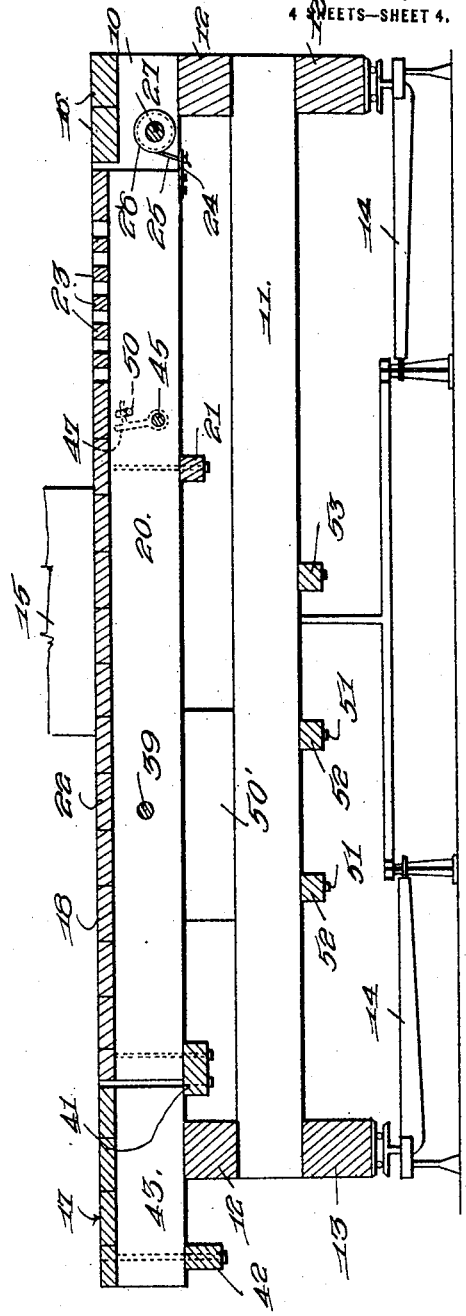
WITNESSES
John Meyer,
F. J. Manseau,
INVENTORS
BY
ATTORNEYS

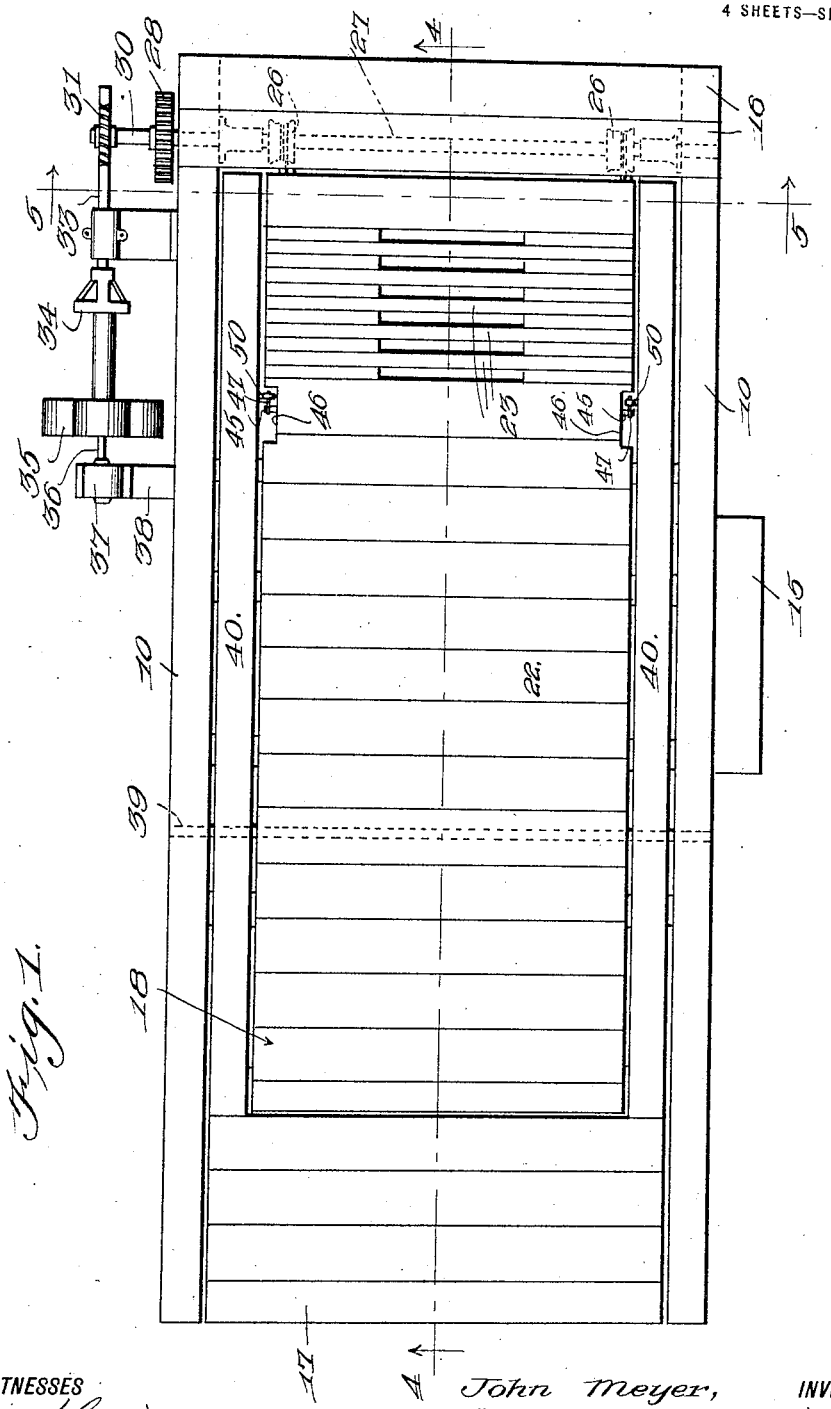

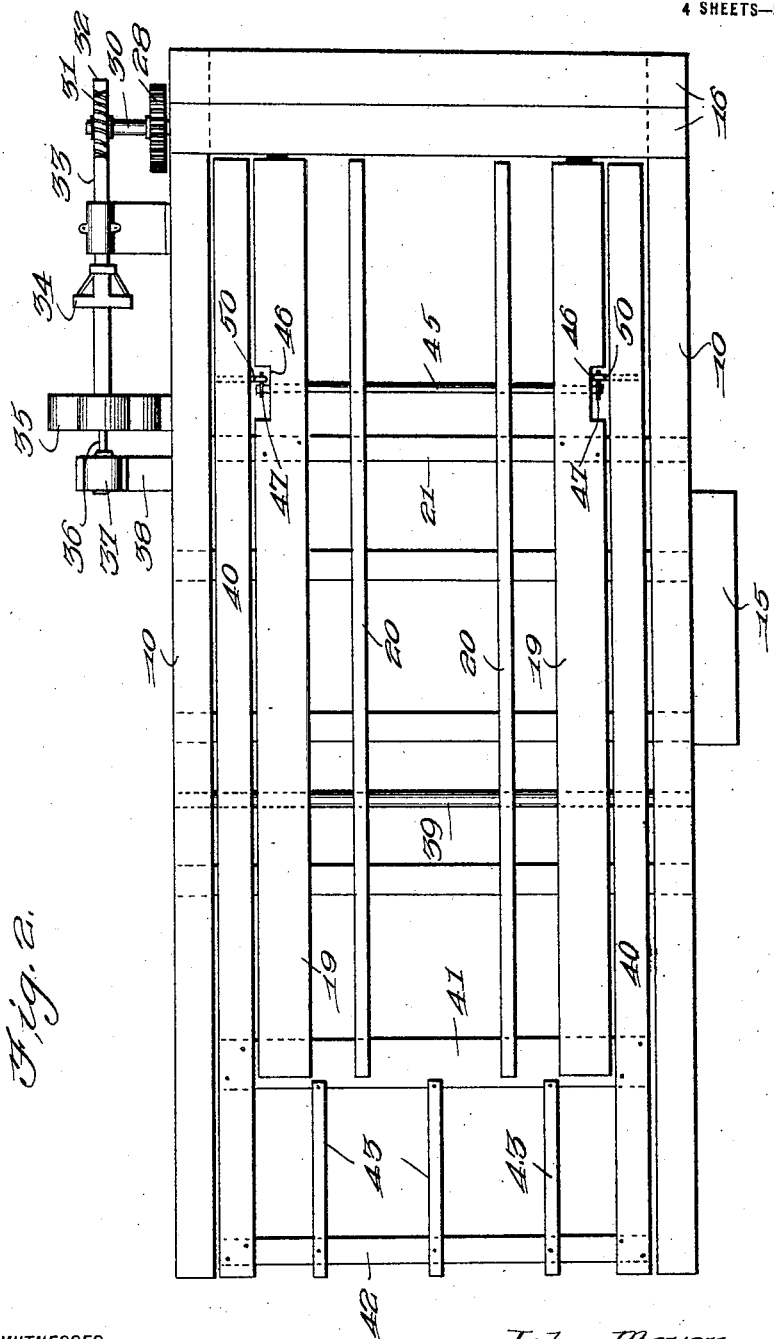

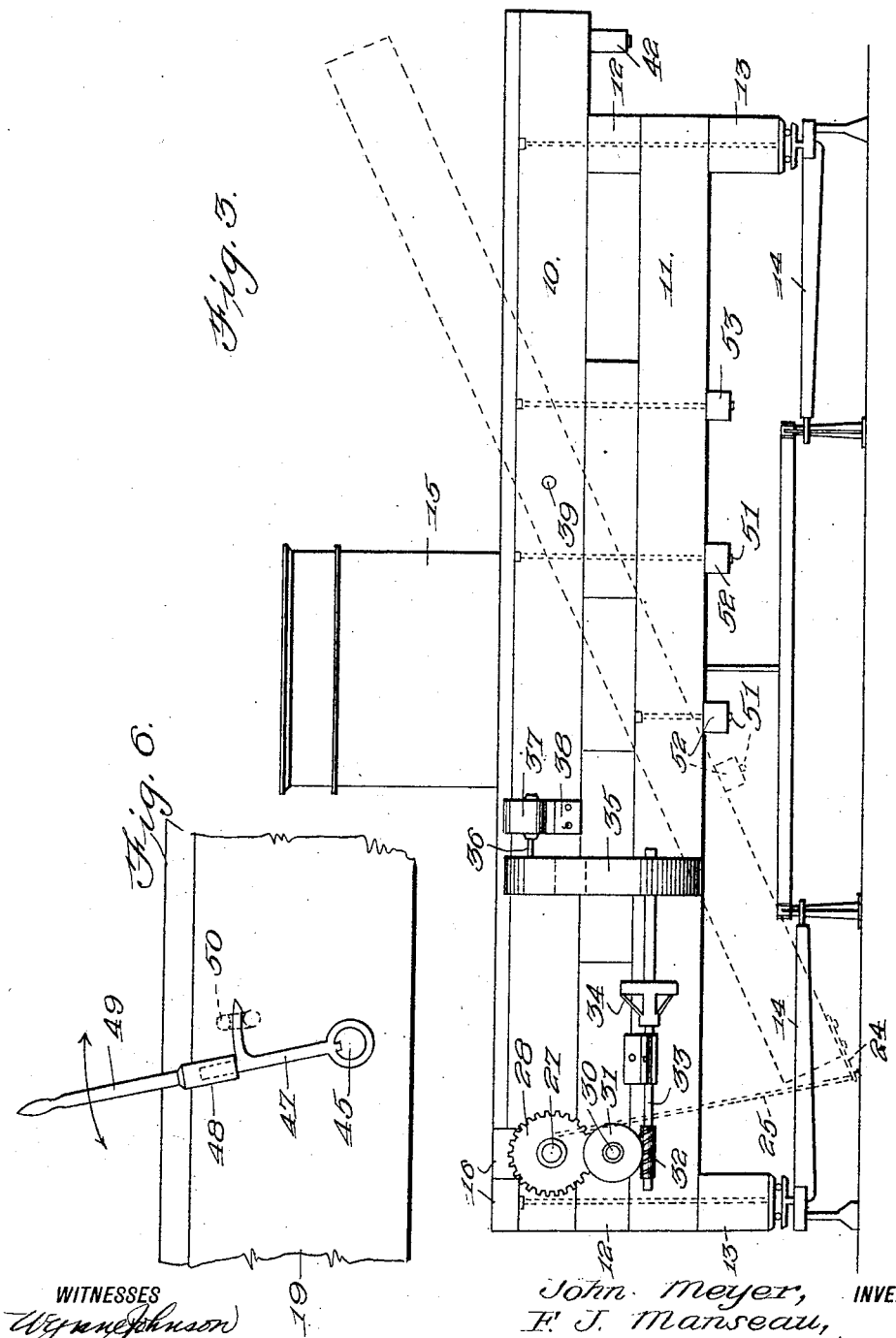

UNITED STATES PATENT OFFICE.

JOHN MEYER AND FRED JOSEPH MANSEAU, OF COTTONWOOD, IDAHO.

COMBINED WAGON AND AUTOMOBILE TRUCK DUMPING AND WEIGHING PLATFORM.

1,403,805. Specification of Letters Patent. Patented Jan. 17, 1922.

Application filed September 2, 1920. Serial No. 407,793.

*To all whom it may concern:*

Be it known that we, JOHN MEYER and FRED JOSEPH MANSEAU, citizens of the United States, and residents of Cottonwood, in the county of Idaho and State of Idaho, have invented certain new and useful Improvements in Combined Wagon and Automobile Truck Dumping and Weighing Platforms, of which the following is a specification.

Our present invention relates generally to dumping platforms for use at grain elevators and other places, and more particularly to a combined wagon and automobile truck dumping platform, our primary object being the provision of an apparatus of this nature which is simple, strong and durable, and which is practical in its nature and which is economical to install.

A further object of the invention is the provision of an apparatus of this nature which is entirely self-contained in the sense that it eliminates the necessity of making any connections in mechanism or parts, either before or after weighing, and a further object is the provision of an apparatus which may be controlled and actuated through the simple operation of a readily reversible electric motor.

A still further object of the invention is the provision of an apparatus of the above nature whose construction eliminates all overhead timber work and hoisting devices, dump locks and other mechanical features, which experience has shown are of unsatisfactory nature in view of their susceptibility to breakage and consequent necessity of frequent repair and replacement.

With these objects in view our invention resides in an apparatus the preferred construction of which is shown in the accompanying drawings, forming a part of this specification, and wherein—

Figure 1 is a top plan view of the complete apparatus;

Figure 2 is a top plan view, the skeleton frames of the wagon and truck dumping platforms being shown, with the surface planks removed;

Figure 3 is a side elevation;

Figure 4 is a vertical longitudinal section taken substantially on the line 4—4 of Figure 1, and looking in the direction opposite to Figure 3;

Figure 5 is a vertical transverse section taken substantially on the line 5—5 of Figure 1;

Figure 6 is an enlarged detail side view of a portion of the wagon dumping platform.

Referring now to these figures, the frame of our improved double dump consists of vertically spaced side beams 10 and 11, the ends of the latter of which are securely bolted between the ends of the upper and lower end across beams 12 and 13, of which the latter rest upon steel beams 14 of any suitable weighing mechanism of which the upper box appears at 15. The ends of the upper end beams 12 are below the upper longitudinal beam 10, and the latter extend at their upper surfaces approximately flush with the upper surfaces of rear cross pieces 16, and these latter are, in turn, with the upper surfaces of the side beams 10, approximately flush with the upper surfaces of the truck platform 17 and the wagon platform 18.

The truck and wagon platforms are disposed between the upper beams 10 of the frame, the wagon platform 18 including side bars 19 in parallel spaced relation and parallel longitudinal strips 20 spaced inwardly beyond the side bars, the rear ends of which bars and strips are entirely free and joined by a single cross brace 21, with the upper surfaces of the side bars 19 and strips 20 adapted to receive the cross planking 22, of which spaced strips 23 from a part adjacent to the rear ends of the wagon platform so as to form substantially a lattice work through which spilled grain from wagons, trucks and the like may drop.

In addition to its other parts, the wagon platform 18 has rigid attachment plates 24 extending from the free rear ends of its side bars 19, these attaching plates receiving the lower ends of a pair of flexible connections 25 extending upwardly and around pulleys 26 mounted on a transverse shaft 27. This shaft 27 is journaled at its opposite ends through the rear portions of the frame side beams 10, beneath the cross pieces 16 of the frame and concealed and protected by the latter, one end of the shaft 27 projecting beyond the respective side of the weighframe and being provided with a gear wheel 28 engaging a smaller gear wheel 29 on the lower parallel stub shaft 30. This arrangement is plainly to be seen by a comparison of Figures 1, 3 and 5, and it will be noted that the stub shaft 30 has a worm wheel 31 secured upon its outer end and engaged by the worm 32 of a shaft 33 having thereon a manually controlled clutch 34 and a pulley engaged by a belt 35 with a pulley on the shaft 36 of an electric motor 37. The latter may be supported upon a bracket 38 outstanding from the weigh-frame and is preferably of any of the well known readily reversible types of motor for a purpose which will be presently described.

Through the side bars 19 of the wagon platform 18 extends a pivot shaft 39, it being noted that this pivot shaft is positioned much nearer to the front end of the wagon platform than the rear end so that when the latter is lowered to the dump position, the rise of the front end is comparatively slight. It will also be noted from Figures 1 and 2 that the pivot shaft 39 extends also through the side bars 40 of the frame of the truck platform 17 and through the upper side bars 10 of the weigh-frame and that in its upper normal position the forward end of the wagon platform 18 rests upon the inner forward cross bar 41 of the truck platform, the latter of which also includes an outer forward cross bar 42. These cross bars connect the forward ends of the side bars 40, which latter parallel and extend along the sides of the wagon platform 18 for the full length of the latter between the same and the side beams 10 of the weigh-frame. As seen in Figure 2 the frame of the truck platform includes longitudinal strips 43 connecting the cross bars 41 and 42 and cross planks 44 covering that portion of the truck platform frame lying forwardly of the wagon platform, completing the former, which is controlled in its movement through the wagon platform and by the same means capable of employment in the control of the latter independent of the truck platform.

To this end the side bars 19 of the wagon platform have journaled therethrough a cross shaft adjacent to the rear end of the platform, whose ends terminate in outer recesses 46 in the side bars 19, the shaft being rotatable and having upon its ends levers 47 which upstand within the recesses 46. The upstanding ends of these levers are adaptable for engagement by the lower socket end 48 of a detachable handle 49, as seen in Figure 6, and each lever is also provided with a curved extending side hook 50 for engagement through the aperture or eye of a rigid bolt projecting inwardly from the adjacent side bar 40 of the truck frame, so that with the two levers 47 in the active position shown in Figure 6, the truck and wagon platforms are locked together for use in connection with the lowering and subsequent raising of a truck on the truck platform 17.

When the wagon platform is to be utilized the levers are released and the wagon platform is thus capable of control and actuation independent of the truck platform.

By reference to Figure 4, it will be noted that a spacing block 50' is utilized between the upper and lower beams 10 and 11 at each side of the weigh-frame below the pivot shaft 39, and connected by vertical bolts 51 projecting through these side beams and through the spacing block as well as through the ends of lower cross braces 52. It will also be noted that the weigh-frame has a bolted cross brace 53 rearwardly of the before mentioned braces 52, which brace 53 also acts as a bumper for the wagon and truck platforms when the latter are lowered to the dumping position.

In operation, the loaded wagon or truck is run on to the respective platforms and weighed, and the motor 37 is then started in the proper direction to lower the flexible connections or cables 25. The motor also acts to control the load as the wagon or truck platform is being lowered to the dumping position shown in dotted lines in Figure 3 to a position sufficient to allow the grain to flow out of the wagon box or the truck body by gravity. When this position is reached, further movement ceases for the time being, either by virtue of disconnecting the motor switch or by the manipulation of the clutch 34. Then by reversing the motor the platform or platforms are brought back to their original inactive position and the switch again withdrawn or the clutch lever again actuated so that the movement again ceases and with the parts in normal position the empty vehicle can be weighed. This statement covers practically the entire operation except that previously described in respect to the connection and disconnection of the two platforms, and it is obvious that the apparatus can, for the above reasons, be adapted with very slight and unimportant changes to practically any platform scale and may be economically installed at practically any location to efficiently and effectively operate without the use of the various mechanical connections required to be made and disrupted before and after weighing with the ordinary dump platforms now in use.

It is also obvious that our improved apparatus eliminates all overhead timber work and hoisting devices, as well as dump locks and other more or less complicated features requiring frequent repair and replacement, and it is obvious that by virtue of the comparatively small lift of the front end of the wagon platform, wagons may be dumped without the necessity of removing the horses from the wagons, the horses standing on the forward portion of the truck platform.

We claim:

1. A dumping apparatus including a weigh-frame having upper cross pieces at one end, a shaft journaled through the said end of the weigh-frame beneath the said cross pieces, a pair of tiltable dump frames, one within the other, means for supporting the frames in independent tiltable relation within the weigh-frame, winding drums on the said shaft, flexible connections joined to one of the tiltable frames and extending around said drum, means for locking the tiltable frames in connected relation, and means for actuating the said drum shafts.

2. A dumping apparatus including a weigh-frame having upper cross pieces at one end, a shaft journaled through the said end of the weigh-frame beneath the said cross pieces, a pair of tiltable dump frames, one within the other, means for supporting the frames in independently tiltable relation within the weigh-frame, winding drums on the said shaft, flexible connections joined to one of the tiltable frames and extending around said drum, means for locking the tiltable frames in connected relation, means for actuating the said drum shafts, said locking means including a shaft journaled through the inner tiltable frame and having locking levers at its opposite ends adjacent to opposite sides of the frame, and lever-engaging members extending inwardly from the sides of the outer tiltable frame into and out of engagement with which the levers are shiftable.

3. A dumping apparatus including a weigh-frame having upper cross pieces at one end, a shaft journaled through the said end of the weigh-frame beneath the said cross pieces, a pair of tiltable dump frames, one within the other, means for supporting the frames in independently tiltable relation within the weigh-frame, winding drums on the said shaft, flexible connections joined to one of the tiltable frames and extending around said drum, means for locking the tiltable frames in connected relation, and means for actuating the said drum shafts, including readily reversible connections supported by the weigh-frame and mounted at one side thereof.

4. A dumping apparatus including a weigh-frame, tiltable dump frames mounted within the upper portion of the weigh-frame, one within the other, and of which the inner tiltable frame is movable to and from dumping position independent of the outer frame, releasable locking connections between the tiltable frames for effecting their simultaneous movement to dumping position, means for controlling and actuating the tiltable frames in their tilting movement, including flexible connections leading to the inner tiltable frame, said tiltable frame locking means including hooks carried by the inner tiltable frame and hook-receiving and engaging means carried by the outer tiltable frame.

JOHN MEYER.
FRED JOSEPH MANSEAU.